(12) United States Patent
Fitzgerald et al.

(10) Patent No.: US 7,724,460 B2
(45) Date of Patent: May 25, 2010

(54) MAGNETO-RESISTIVE HEAD RESISTANCE SENSOR

(75) Inventors: David J. Fitzgerald, Inver Grove Heights, MN (US); Jeffrey A. Gleason, Burnsville, MN (US); James P. Howley, Broomfield, CO (US); Scott M. O'Brien, Eagan, MN (US); Michael P. Straub, Longmont, CO (US)

(73) Assignee: Agere Systems Inc., Allentown, PA (US)

( * ) Notice: Subject to any disclaimer, the term of this patent is extended or adjusted under 35 U.S.C. 154(b) by 907 days.

(21) Appl. No.: 11/034,997

(22) Filed: Jan. 13, 2005

(65) Prior Publication Data

US 2006/0152838 A1 Jul. 13, 2006

(51) Int. Cl.
*G11B 5/02* (2006.01)
*G11B 5/03* (2006.01)
*G11B 5/09* (2006.01)

(52) U.S. Cl. ............. 360/67; 360/46; 360/66; G9B/5.031; G9B/5.026

(58) Field of Classification Search ........... None
See application file for complete search history.

(56) References Cited

U.S. PATENT DOCUMENTS

| | | | | |
|---|---|---|---|---|
| 6,115,201 A | * | 9/2000 | Enarson et al. | 360/66 |
| 7,154,689 B1 | * | 12/2006 | Shepherd et al. | 360/48 |
| 7,190,214 B2 | * | 3/2007 | Barnett et al. | 327/563 |
| 7,206,154 B2 | * | 4/2007 | Lee et al. | 360/67 |
| 2005/0168860 A1 | * | 8/2005 | Gleason et al. | 360/67 |

* cited by examiner

*Primary Examiner*—Daniell L Negrón
(74) *Attorney, Agent, or Firm*—Mendelsohn, Drucker & Associates, P.C.; Steve Mendelsohn

(57) ABSTRACT

A recording system employing a magneto-resistive (MR) element senses a resistance value of the MR element and generates one or more MR resistance (MRR) signal values based on the sensed MR element resistance value. The MRR signal values might be, for example, current or voltage values proportional or inversely proportional to the MR element resistance value. The MRR signal values might be employed to control one or more of: i) a unity gain bandwidth of a bias loop for the MR element, ii) an MR read head preamplifier low corner frequency, and iii) a slew rate across the MR element.

27 Claims, 11 Drawing Sheets

MAGNETO-RESISTIVE HEAD RESISTANCE SENSOR

BACKGROUND OF THE INVENTION

1. Field of the Invention

The present invention relates to circuits for transferring data to and from a recording medium and, in particular, to circuits of a magneto-resistive read head.

2. Description of the Related Art

Conventional recording systems of the prior art encode data and write the encoded data to a recording medium, such as a magnetic hard drive or an optical recording disc. A read channel component is an integrated circuit (IC) of a computer hard disk (HD) drive that encodes, detects, and decodes data, enabling a read/write head to correctly i) write data to the disk drive and ii) read back the data. The encoded data is written to the disc (or other recording medium) by a read/write head. In a magnetic recording system, data is recorded by a head by varying the magnetic field over a bit position ("cell") on the surface of the recording disc. Data is read by sensing magnetic variations corresponding to the data as the head passes over the cell.

Two types of disc drive systems might be employed to write information to or read information from a disc. One type is an inductive write/inductive read system, and the other type is an inductive write/magneto-resistive (MR) read system. Inductive write/inductive read systems employ a single inductive element (coil) that is used to both write and read data. However, as track densities increase, mismatch between ideal coil settings for write and read operations due to resonance frequency changes decreases the data bandwidth. Consequently, for inductive write/MR read systems, an inductive element is selected and optimized for write operations, while an MR element is employed for read operations. The MR element is a resistive element that is biased, either by voltage or current, and variations in the magnetic field detected by the MR element result in variations in the resistance value of the MR element. Variations in resistance of the MR element produce signal variations that are subsequently amplified by a preamplifier and provided as the detected data. An MR read head generally comprises the MR element, while the MR reader generally comprises at least a portion of the preamplifier having MR bias and other control loop circuitry (also termed an MR reader).

The resistance of a particular MR element in a given manufacturer's disk drive can vary over a wide range. It is desirable to accommodate head-to-head MR element resistance variations of 4:1 and higher in a given preamplifier design used in conjunction with the MR element. The value of the MR resistance ($R_{MR}$) affects the design of a disk drive preamplifier used to amplify signals from the MR element. Head-to-head variations in $R_{MR}$ affect i) the gain and bandwidth of an MR element bias loop used to provide current/voltage bias to the MR element, ii) the setting of a low corner frequency of the MR reader, and iii) read-to-write and write-to-read transition times. Write-to-read transition time and read-to-write transition time are measures of the preamplifier's ability to quickly switch between operating modes.

In write mode, reduced or no bias voltage is applied to the MR element, because edge rates of the writer output are very fast. These edge rates might be fast enough to travel down the writer traces of the flex interconnect from the writer output of the preamplifier to the inductive write head, coupling across the interconnect to the reader traces on the flex interconnect which connect the MR element to the reader input of the preamplifier. Overbiasing the MR element can cause damage to the read head and reduce the read head's life span. So, reducing or removing the bias voltage placed across the MR element and pulling the read head to ground protects the MR element during write mode. When the preamplifier is in write mode, the MR bias loop is in slow mode for two reasons. First, in slow mode, the bandwidth of the loop is low so that any coupling due to the fast edges of the writer signal into the MR bias loop is ignored, and second, operating the MR bias loop in slow mode reduces power consumption. The difference between fast and slow modes is the MR bias feedback loop unity gain frequency. The unity gain frequency determines the rate that the MR bias can change.

When the preamplifier switches from write mode to read mode during the write-to-read transition, a bias voltage is applied relatively quickly to the MR element so that data may be read from the disk without wasting time or disk space. The preamplifier switches into fast mode so that the desired voltage applied to the MR element can be quickly reached. The MR bias loop then switches back into slow mode. In slow mode, the unity gain frequency of the MR bias loop is set below that of the lowest frequency content of the data to be read so that MR bias loop operation does not corrupt the data being read from the disk.

In read mode, the MR element has some bias voltage (or current) applied to it, and data is read from the disk. The MR bias loop operates in slow mode so as not to corrupt the data being read from the disk. As the preamplifier switches from read mode to write mode during the read-to-write transition, the MR bias loop switches into fast mode so that the bias voltage may be either reduced or removed altogether when in write mode. After the desired bias voltage level for write mode is reached, the MR bias loop switches back into slow mode.

Variations in MR resistance change the gain of the MR bias loop, thus affecting the MR bias loop's performance and stability. FIG. 1 shows a block diagram of prior art MR bias loop 100 that biases the MR element $R_{MR}$ in an MR reader. The voltage $V_{MR}$ across $R_{MR}$ ($V_{MR}$ is the voltage between nodes Vmr+ and Vmr−) is sensed and compared to a programmable offset voltage inside of gain stage 110. Gain stage 110 amplifies the difference between $V_{MR}$ and the programmable offset voltage by amplification factor A to provide output voltage $V_{ERR}$. The resulting output voltage $V_{ERR}$ of gain stage 110 is amplified by transconductance stage 111 (with transconductance Gm, i.e., the slope of the transconductance stage's operating transfer characteristic).

The output signal of transconductance stage 111 is integrated via capacitor $C_{INT}$, with the voltage across $C_{INT}$ employed to bias $R_{MR}$ through bias resistors $R_{B1}$ and $R_{B2}$ ($R_{B1}$ substantially equals $R_{B2}$ equaling $R_B$) via isolating (unity-gain) amplifiers 102 and 103. MR bias loop 100 operates to drive $V_{ERR}$ to zero volts (differential). When $V_{ERR}$ is zero volts (differential), the bias voltage applied to the MR element $R_{MR}$ is equal to the programmable offset voltage.

The DC loop gain $A_{loop(DC)}$ of MR bias loop 100 is given in equation (1):

$$A_{loop(DC)} = A G m R_0 \left( \frac{R_{MR}}{R_{MR} + 2R_B} \right), \tag{1}$$

where A is a constant and $R_0$ is the output impedance of transconductance stage 111. The unity gain bandwidth (UGB) of MR bias loop 100 is given in equation (2):

$$UGB = AGmR_0 \left( \frac{R_{MR}}{R_{MR} + 2R_B} \right) \left( \frac{1}{2\pi R_0 C_{INT}} \right) = \left( \frac{AGmR_{MR}}{2\pi C_{INT}(R_{MR} + 2R_B)} \right). \quad (2)$$

As shown in equation (1), a higher value of $R_{MR}$ yields a larger loop gain $A_{loop(DC)}$, which may lead to loop instability. As shown in equation (2), a higher value of $R_{MR}$ also causes an increase in UGB.

The setting of a low corner frequency $f_{LC}$ of the MR reader also varies with variations in the MR resistance $R_{MR}$. A second loop ("low corner frequency (LCF) loop") controls $f_{LC}$ of the first gain stage of the MR reader. For inductive write/MR read systems, a cross-coupled current sense (CCCS) reader is a preamplifier circuit that is employed with the MR element to read data from a recording medium. FIG. 2 shows CCCS reader 200 employed as the first gain stage of an MR reader. CCCS reader 200 is configured such that the changing magnetic field of the cell causes current variations in the MR element ($R_{MR}$) as the element moves over the cell. CCCS reader 200 amplifies the current variations through $R_{MR}$ caused by varying differential input voltage $V_{IN}(=Vmr)$ across $R_{MR}$, and translates them into an output signal $V_{OUT}$ representing sensed data. CCCS reader 200 includes a driver section for the voltage across $R_{MR}$ including transistors M1 and M2, load resistors $R_{L1}$ and $R_{L2}$ ($R_{L1}$ equals $R_{L2}$ equals $R_L$), and current sources $I_{A1}$ and $I_{A2}$ that are configured as a differential amplifier through transconductance stage 201. CCCS reader 200 employs AC coupling of the driver section to transconductance stage 201 (through transistors Q1 and Q2, current sources $I_{A3}$ and $I_{A4}$, and coupling capacitors $C_{CC1}$ and $C_{CC2}$ ($C_{CC1}$ equals $C_{CC2}$ equals $C_{CC}$).

The low corner frequency $f_{LC}$ of CCCS reader 200 is set to pass the lowest frequency content of the data being read from the disk while rejecting frequency content beneath that of the data. The unity gain bandwidth of the MR bias loop is maintained beneath that of $f_{LC}$ of CCCS reader 200. Otherwise, operation of the MR bias loop interacts with operation of the LCF loop, causing peaking in the frequency response of CCCS reader 200 and possible circuit instability. Furthermore, if the UGB of the MR bias loop extends to the frequency of data being read from the disk, then the MR bias loop corrupts the read data while attempting to maintain a constant bias across the MR read head.

However, it is desirable to maintain as high a gain as is possible in the MR bias loop so as to maximize accuracy of the MR bias loop. Thus, system designs that allow for a large variation in MR resistance make a trade-off between i) MR bias loop accuracy for low values of $R_{MR}$ and ii) UGB for high values of $R_{MR}$.

The low corner frequency $f_{LC}$ of the MR reader is set by the gain of CCCS reader 200, the transconductance during slow mode (denoted by $Gm_{Reader}$) of the CCCS reader 200, and the capacitance of the cross-coupling capacitors in the first gain stage of CCCS reader 200. The low corner frequency $f_{LC}$ is proportional to the approximation given in equation (3):

$$f_{LC} \propto \frac{AGm_{Reader}}{C_{CC}} \approx \frac{2R_L Gm_{Reader}}{R_{MR} C_{CC}}, \quad (3)$$

As shown in equation (3), $f_{LC}$ of CCCS reader 200 decreases as the value of $R_{MR}$ increases, which is the opposite of the effect of increasing $R_{MR}$ on the UGB of the MR bias loop. The risk of overlapping between i) the loop bandwidths of the MR bias loop and ii) the LCF loop setting the $f_{LC}$, thus interfering with one another, due to variations in $R_{MR}$ increases substantially for larger variation range of $R_{MR}$.

Read head voltage slew rate also varies with variations in $R_{MR}$. The read head voltage slew rate is a measure of the preamplifier's (MR reader's) ability to rapidly change the bias voltage across the read head when switching between write and read operations. MR readers are increasingly sensitive to overbias conditions. Placing too large a voltage across the MR element significantly reduces the life expectancy of the head, and so avoiding voltage overshoot while ramping up the voltage across the MR element is desirable. While writing data to the disk, the MR bias circuit that provides the bias to the MR element may be turned off and both ends of the read head pulled to ground to minimize damaging effects from write head signals coupling onto the MR element. However, the MR reader should switch quickly from write mode into read mode to avoid wasting valuable disk space.

Referring to FIG. 1, there is a constant slew rate across integration capacitor $C_{INT}$. The slew rate S is set by the maximum output current $I_{GmMAX}$ of transconductance stage 111 and the value of CANT and is as given by equation (4):

$$S = \frac{I_{GmMAX}}{C_{INT}}. \quad (4)$$

However, the slew rate $S_{HEAD}$ seen at the MR read head (across the MR element) varies proportionally to the value of $R_{MR}$. The slew rate $S_{HEAD}$ at the MR element is given in equation (5):

$$S_{HEAD} = \frac{I_{GmMAX}}{C_{INT}} \left( \frac{R_{MR}}{R_{MR} + 2R_B} \right) \quad (5)$$

With a range of values for $R_{MR}$ between 15Ω and 70Ω, and a typical value for $R_B$ of approximately 300Ω, the variation in slew rate at the MR read head may vary by approximately 4:1.

To minimize preamplifier switching time from write mode to read mode (the write-to-read recovery time), the maximum output current $I_{GmMAX}$ of transconductance stage 111 in MR bias loop 100 of FIG. 1 can be increased during this transition time. Increasing $I_{GmMAx}$ increases the slew rate seen at the MR reader, as given by equation (5). The value of Gm of transconductance stage 111 in MR bias loop 100 can be increased to a higher value during this transition from write mode into read mode. The increased value of Gm increases the UGB of the MR bias loop to maintain stability with the increased slew rate, which might be accomplished by i) increasing a tail current in a transconductance stage (Gm-stage) undegenerated differential pair, or ii) operating two Gm-stages in parallel. For the second method, a low-gain Gm-stage and a high-gain Gm-stage are used. The high-gain Gm stage is active only during the write mode to read mode transition.

With a faster slew rate seen at the MR read head, $f_{LC}$ of the first gain stage (e.g., CCCS reader 200) is also increased so that the LCF loop can track the rapid change in MR bias voltage without i) interfering with the MR bias loop, ii) causing overshoot in the MR bias voltage, or iii) instability. Increasing $f_{LC}$ of the first gain stage might be accomplished in a manner similar to that described for minimizing the preamplifier switching time by increasing the UGB of MR bias loop 100. The slew rate across the cross-coupling capacitors, $C_{CC1}$ and $C_{CC2}$, and the gain of the transconductance stage, $Gm_{READER}$, are set to relatively high values during this write-to-read transition time, while still maintaining loop stability. This slew rate across the cross-coupling capacitors and the gain of the transconductance stage during this write-to-read transition time determine the maximum slew rate allowed at the MR read head. The maximum slew rate seen at the head occurs when $R_{MR}$ is at its maximum value, but to slew from zero volts across the read head to its final value (given the previously described range of values for $R_{MR}$) might take up to four times longer when $R_{MR}$ is at its minimum value.

SUMMARY OF THE INVENTION

In accordance with exemplary embodiments of the present invention, a resistance value of a magneto-resistive (MR) element is sensed and one or more MR resistance (MRR) signal values are generated based on the sensed MR element resistance value. The MRR signal values might be, for example, current or voltage values proportional and inversely proportional to the MR element resistance value. The MRR signal values might be employed to control one or more of: i) a unity gain bandwidth of a bias loop for the MR element, ii) an MR read head preamplifier low corner frequency, and iii) a slew rate across the MR read head when changing bias voltage or current levels.

In accordance with one embodiment of the present invention, at least one signal related to an impedance of a read element in a read channel of a read head is generated by a) providing a first signal of the read element; b) providing a second signal of the recording head circuit portion, the read head circuit portion including the read element; and c) generating a combination of the first and second signals as the at least one signal related to the impedance of the read element.

In accordance with another embodiment, the present invention is a read head for a read channel component of a recording system. The read head comprises a read element, an amplifier, a bias circuit, and an impedance sensor. The amplifier is coupled to the read element and adapted to amplify a voltage signal across the read element. The bias circuit is coupled to the read element and adapted to apply a biasing signal to the read element. The impedance sensor coupled to the read element and adapted to sense the impedance of the read element and generate one or more control signals for controlling operations of at least one of the preamplifier and the bias circuit.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 3:
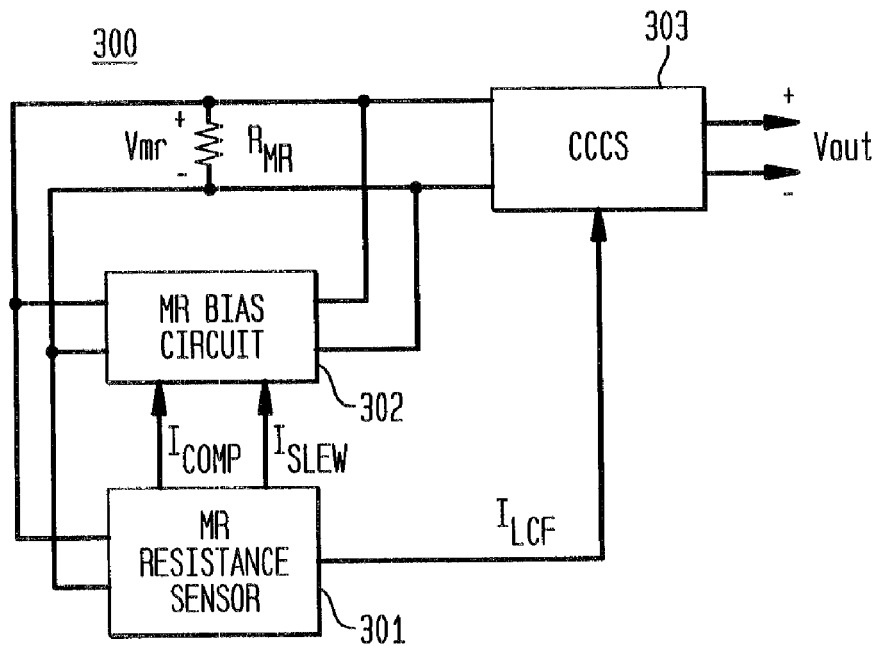
FIG. 3 shows an MR resistance sensor operating in accordance with one or more embodiments of the present invention.

FIG. 3 shows magneto-resistive (MR) read head (MR reader) portion 300 operating in accordance with one or more embodiments of the present invention. As shown in FIG. 3, MR reader portion 300 comprises an MR resistor $R_{MR}$, MR resistance sensor 301, MR bias circuit 302, and cross-coupled current sense amplifier (CCCS) 303. CCCS 303 is employed to amplify a signal sensed as current variations through $R_{MR}$ corresponding to data read from, for example, a magnetic recording medium. MR resistance sensor 301 senses an impedance value of $R_{MR}$, such as a resistance value of $R_{MR}$, and generates at least one of signals $I_{COMP}$, $I_{LCF}$, and $I_{SLEW}$, each of which signals is based on the sensed value of $R_{MR}$. While shown in FIG. 3 as current signals, each of $I_{COMP}$, $I_{LCF}$, and $I_{SLEW}$ might be either a current or voltage signal, either proportional or inversely proportional to the value of $R_{MR}$.

Figure 2:
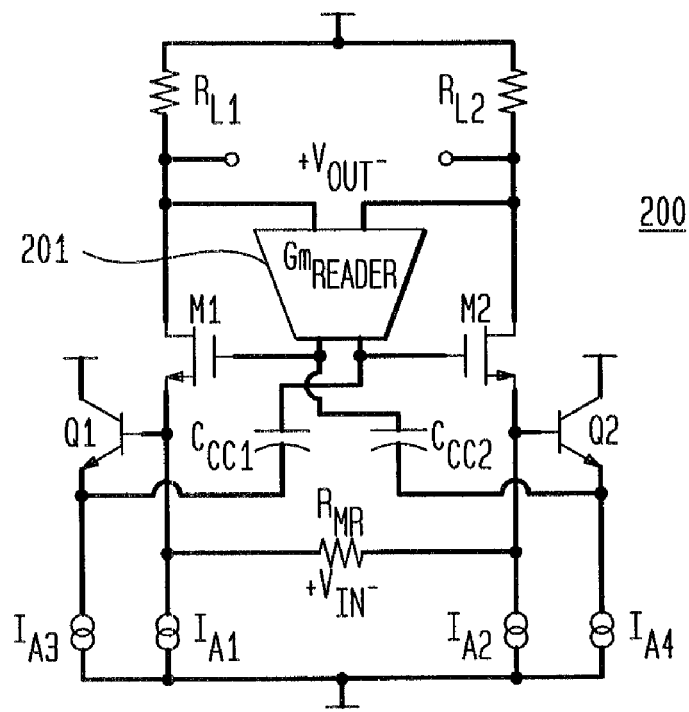
FIG. 2 shows a prior art cross-coupled current sense reader employed as the first gain stage of an MR reader.

In accordance with a first exemplary embodiment of the present invention, the signal $I_{COMP}$ is employed to provide control of the unity gain bandwidth (UGB) of MR bias circuit 302. In accordance with a second exemplary embodiment of the present invention, the signal $I_{LCF}$ is employed to vary the gain of transconductance stage $Gm_{READER}$ and the slew rate across cross-coupling capacitors $C_{CC1}$ and $C_{CC2}$ of cross-coupled current sense amplifier 303, which may be implemented using CCCS 200 of FIG. 2. In accordance with a third exemplary embodiment of the present invention, the signal $I_{SLEW}$ is employed to vary a gain of MR bias circuit 302 to provide control of the voltage slew rate of the voltage across $R_{MR}$, set via MR bias circuit 302.

While the exemplary embodiments of the present invention are described herein with respect to particular current or voltage signals, such as differential signals, and with respect to particular amplifier and transconductance values/configurations, the present invention is not so limited. One skilled in the art might extend the teachings herein to various circuit configurations performing similar functions as the embodiments described herein. In addition, while the present invention is described herein with respect to sensing variations in a magneto-resistive element's value in a read head in a magnetic recording system, the present invention is not so limited. One skilled in the art might extend the teachings herein to sensing the variation in a read element's value for other types of elements in other types of recording systems, such as optical components in an optical recording system.

Operation of MR resistance sensor 301 is now described with respect to various exemplary implementations. To sense the resistance of the MR read head, the voltage (Vmr) across the head and the current ($I_{mr}$) through the head are sensed. Using the relation that Vmr equals $I_m R_{MR}$, the resistance value for $R_{MR}$ is then determined.

Figure 4:
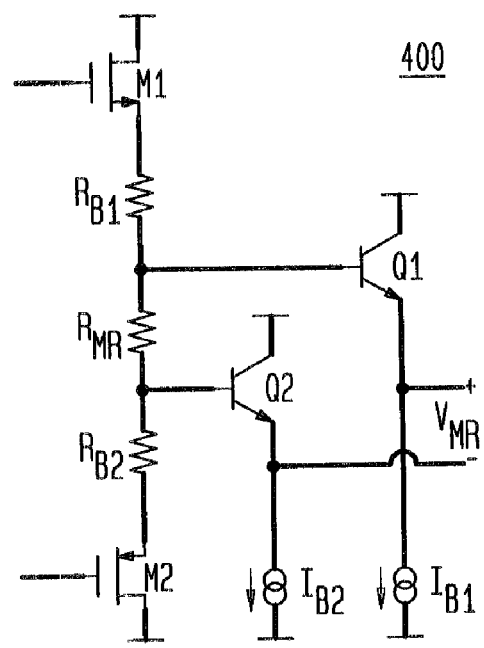
FIG. 4 shows an exemplary circuit employed to generate a voltage proportional to the bias voltage across the MR element.

FIG. 4 shows exemplary circuit 400 employed to generate voltage Vmr proportional to the voltage across $R_{MR}$. Circuit 400 comprises gain (e.g., unity gain) amplifiers M1 and M2 shown implemented as MOS source followers, degeneration bias resistors $R_{B1}$ and $R_{B2}$ (e.g., $R_{B1}=R_{B2}=R_B$), and MR element $R_{MR}$. Amplifiers M1 and M2 and degeneration bias resistors $R_{B1}$ and $R_{B2}$ are employed to bias MR element $R_{MR}$. Circuit 400 further comprises a first pair of emitter followers Q1 and Q2 driven by corresponding current sources $I_{B1}$ and $I_{B2}$. The pair of emitter followers Q1 and Q2 senses the voltage across MR element $R_{MR}$.

Figure 5:
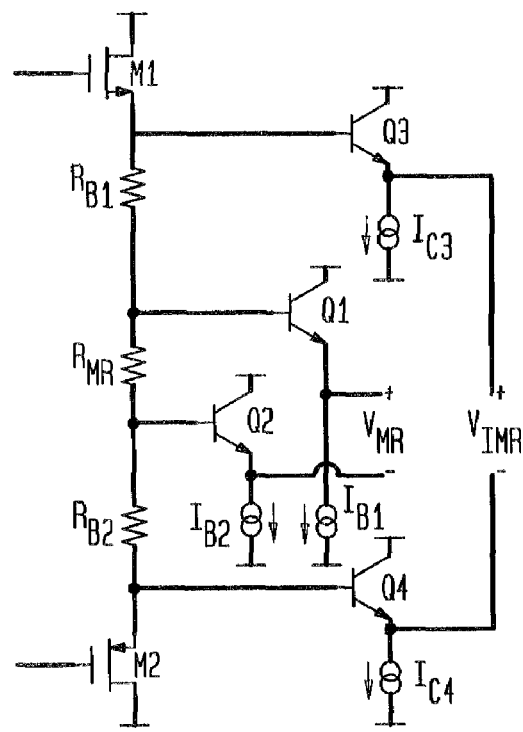
FIG. 5 shows a voltage-sensing circuit generating voltages employed by the MR resistance sensor of FIG. 3.
Figure 6:
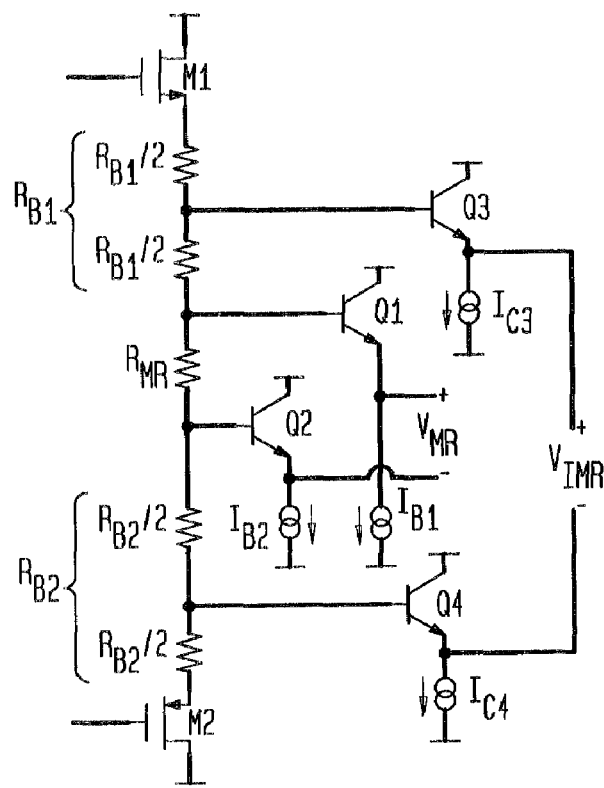
FIG. 6 shows an alternative to the circuit of FIG. 5 that employs center-tapping of bias resistors.

FIG. 5 shows voltage-sensing circuit 500 employed to sense a voltage Vimr across the MR read head (e.g., a voltage across the MR element and the circuit biasing the MR element) from which, along with voltage Vmr, the current passing through MR element $R_{MR}$ can be derived. Voltage-sensing circuit 500 is similar to exemplary circuit 400 of FIG. 4, but with a second pair of emitter followers Q3 and Q4, driven by corresponding current sources $I_{C3}$ and $I_{C4}$, configured to sense a voltage Vimr across the resistor voltage-divider chain of series-connected resistors $R_{B1}$, $R_{MR}$, and $R_{B2}$. By sensing the voltage Vimr across the entire resistor divider chain, the current through the MR read head might be inferred since this voltage is also proportional to the current flowing through MR element $R_{MR}$. It is desirable to maximize the degeneration resistance, $R_B$, to minimize the noise coupling of the MR bias loop into the input of the first gain stage. In general, most or all of the available headroom in an MR read head's driver circuitry is used under the worst-case conditions (such as maximum read head bias current, maximum read head resistance, and maximum degeneration resistor sheet rho). FIG. 6 shows an alternative to the circuit of FIG. 5 that employs center-tapping of bias resistors $R_{B1}$ and $R_{B2}$. The alternative circuit of FIG. 6 provides additional headroom for current source $I_{C4}$ and emitter follower Q4 used to sense the "negative" node of Vimr.

Other alternative circuits to that shown in FIG. 5 might comprise a "dummy" read head with an associated driver circuit to sense Vimr, where the dummy read head duplicates the functions of the MR read head, but is isolated from the MR read head circuitry. The percent voltage error $\text{Vimr}_{ERR}[\%]$ between the voltage Vimr across the MR read head and the voltage Vimrdum across the dummy read head driver circuit is the difference in value between the dummy resistor $R_{MRdummy}$ and MR element resistance value of $R_{MR}$, as given in equation (6):

$$\text{Vimr}_{ERR}[\%] = \left[\frac{(R_B + R_{MRdummy})(2R_B + R_{MR})}{(2R_B + R_{MRdummy})(R_B + R_{MR})} - 1\right] * 100\% \quad (6)$$

For typical values of $R_B=300$ ohms and $R_{MRdummy}=40$ ohms, for minimum and maximum values of $R_{MR}$ of 15 and 70 ohms, the error in Vimr would be approximately 4%. For the following described embodiments, sensing of voltage Vimr occurs in the MR reader's driver circuit instead of a dummy read head, though the present invention is not so limited.

Figure 7:
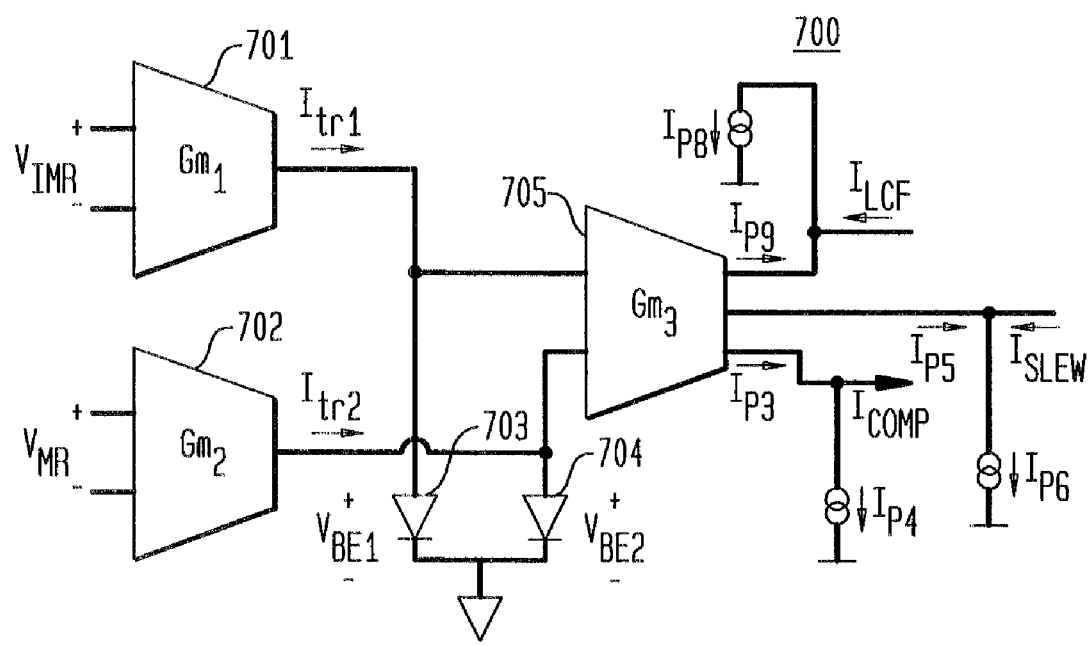
FIG. 7 shows an MR current generator circuit as may be employed for the MR resistance sensor of FIG. 3 to provide output currents for controlling one or more of unity gain bandwidth, low corner frequency, and voltage slew rate of the MR reader.
Figure 8:
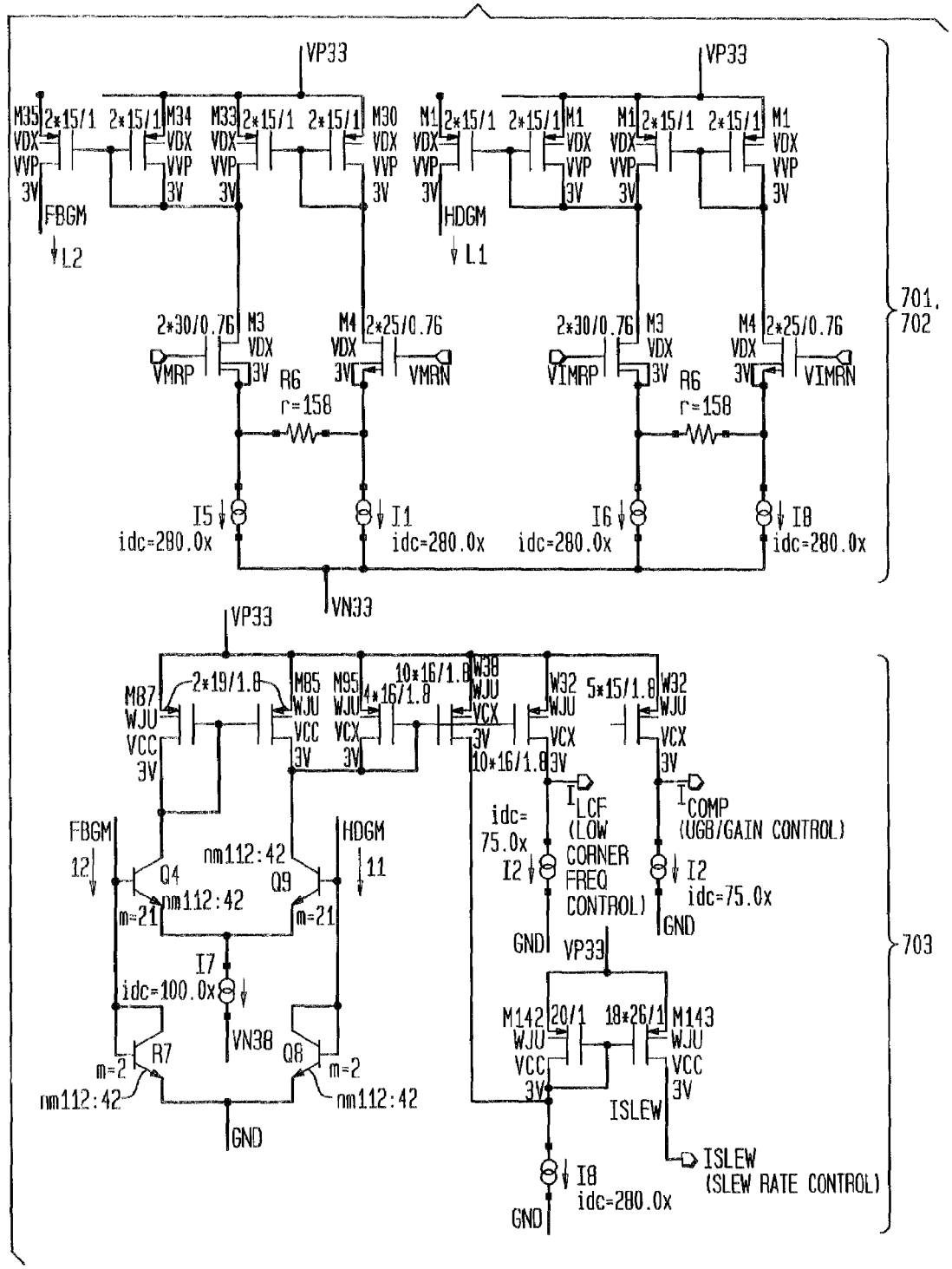
FIG. 8 shows an exemplary circuit schematic for an exemplary implementation of the current generator circuit of FIG. 7.

MR resistance sensor 301 (FIG. 3) applies voltages Vmr and Vimr to one or more circuits that generate one or more corresponding output currents proportional to $R_{MR}$. FIG. 7 shows MR current generator circuit 700, which might be a portion of MR resistance sensor 301 of FIG. 3, providing output currents for controlling one or more of unity gain bandwidth (UGB), low corner frequency (LCF or $f_{LC}$), and voltage slew rate of the MR reader. FIG. 8 shows a detailed circuit schematic for an exemplary implementation of MR current generator circuit 700.

Returning to FIG. 7, transconductance stage 701 (with transconductance $Gm_1$) generates current $I_{tr1}$ proportional to input voltage Vimr. Since voltage Vimr is proportional to MR read head current $I_{MR}$, $I_{tr1}$ is proportional to $I_{MR}$. Transconductance stage 702 (with transconductance $Gm_2$) generates current $I_{tr2}$ that is proportional to input voltage Vmr. Current $I_{tr1}$ and current $I_{tr2}$ are as given in equations (7) and (8):

$$I_{tr1} = Gm_1 \text{Vimr} \quad (7)$$

$$I_{tr2} = Gm_2 \text{Vmr} \quad (8)$$

Currents $I_{tr1}$ and $I_{tr2}$ are provided to diodes 703 and 704, respectively, to develop voltage $V_{BE1}$ and $V_{BE2}$, as given in equations (9) and (10):

$$V_{BE1} = V_T \ln \frac{I_{tr1}}{I_s} \quad (9)$$

$$V_{BE2} = V_T \ln \frac{I_{tr2}}{I_s}, \quad (10)$$

where $V_T$ is the thermal voltage of each diode, and $I_s$ is the diode source current. The voltage difference $\Delta V_{BE}$ seen at the input of transconductance stage 705 (with transconductance $Gm_3$) is given in equation (11):

$$\Delta V_{BE} = (V_{BE1} - V_{BE2}) = V_T \ln \frac{I_{tr1}}{I_{tr2}}, \quad (11)$$

Since $I_{tr1}$ is proportional to $I_{MR}$ and $I_{tr2}$ is proportional VMR, the ratio of $I_{tr1}$ to $I_{tr2}$ is inversely proportional to the resistance of $R_{MR}$. The output current $I_{P3}$ of third transconductance stage 705 is approximately given in equation (12):

$$I_{P3} = Gm_3 V_T \ln \frac{I_{tr1}}{I_{tr2}} = Gm_3 V_T \ln \frac{Gm_1 \text{Vimr}}{Gm_2 \text{Vmr}} \quad (12)$$

Current source $I_{P4}$ determines the maximum current output of this circuit, $I_{COMP}$, which occurs when $I_{P3}$ equals zero. For a given bias voltage across the MR reader, Vmr, the voltage Vimr varies, depending on the resistance value of $R_{MR}$, as given in equation (13):

$$\text{Vimr} = V_{MR} + \frac{V_{MR}}{R_{MR}} R_B = V_{MR}\left(1 + \frac{R_B}{R_{MR}}\right) \quad (13)$$

Thus, as the value of $R_{MR}$ increases, the output current $I_{COMP}$ increases as given in equation (14):

$$I_{COMP} = (I_{P4} - I_{P3}) \tag{14}$$
$$= I_{P4} - Gm_3 V_T \ln \frac{Gm_1 Vimr}{Gm_2 Vmr}$$
$$= I_{P4} - Gm_3 V_T \ln \left[ \frac{Gm_1}{Gm_2}\left(1 + \frac{R_B}{R_{MR}}\right) \right]$$

Figure 1:
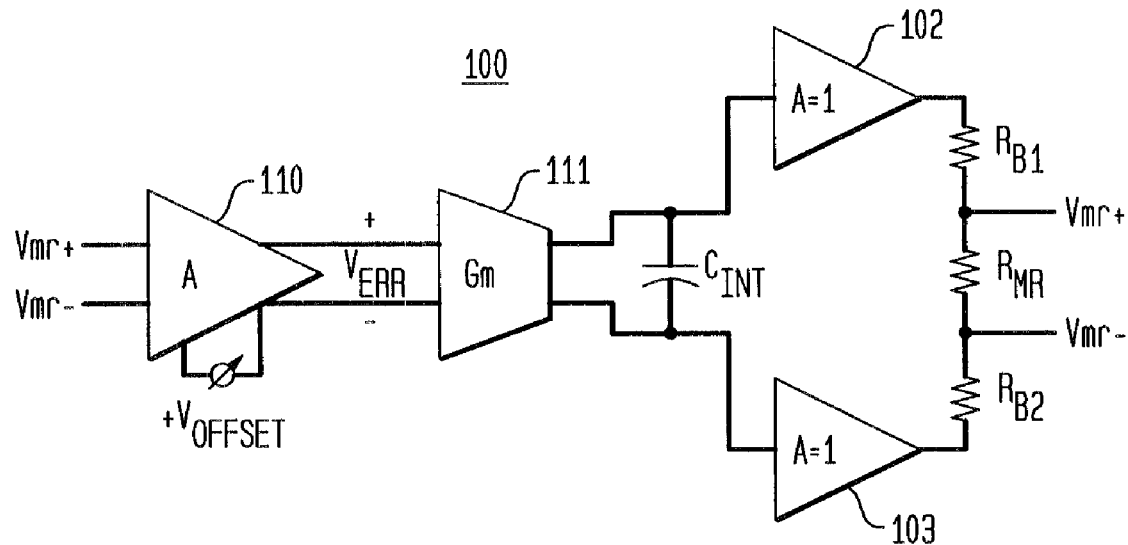
FIG. 1 shows a circuit diagram of a prior art magneto-resistive (MR) bias loop of an MR reader.
Figure 9:
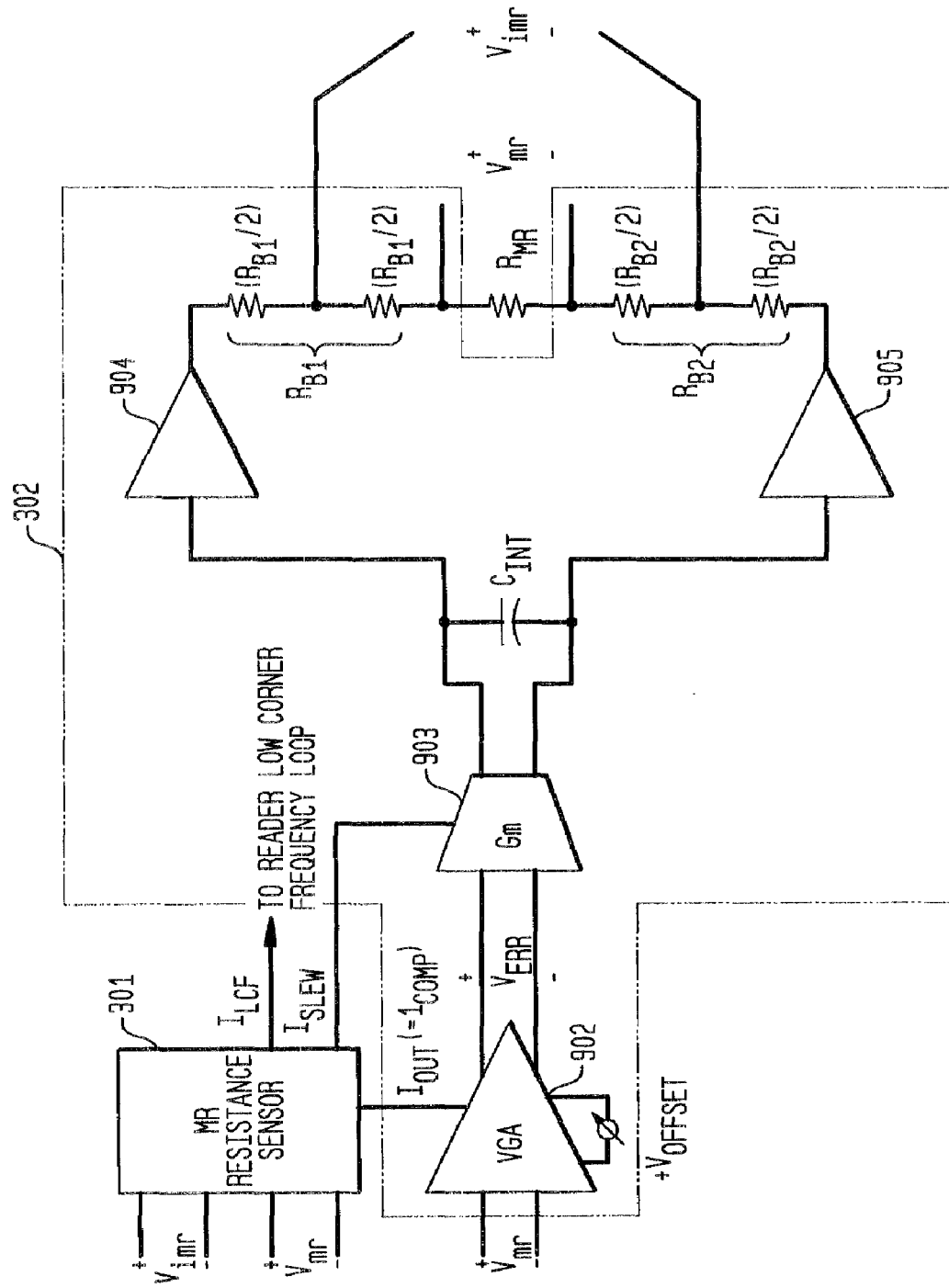
FIG. 9 shows an exemplary configuration providing MR bias unity gain bandwidth control employing the output current of FIG. 7.

Given an output current $I_{COMP}$ that increases (decreases) as the value of $R_{MR}$ increases (decreases), MR bias UGB might be controlled as follows. FIG. 9 shows an exemplary configuration providing MR bias UGB control for the configuration of FIG. 3 employing the output current $I_{COMP}$ of FIG. 7. MR resistance sensor 301 provides the control output current $I_{COMP}$ as described in equation (14) to VGA 902. VGA 902 and transconductance 903 might be included in MR bias circuit 302 of FIG. 3. Operation of MR bias circuit 302 is similar to that described for the prior art MR bias circuit of FIG. 1, except that center-tapping of bias resistors $R_{B1}$ and $R_{B2}$ is employed to provide voltages Vmr and Vimr to current MR resistance sensor 301 and VGA 902 replaces amplifier 110. VGA 902 compares the sensed voltage Vmr to a programmable offset voltage $V_{OFFSET}$ and amplifies the difference between Vmr and the programmable offset voltage $V_{OFFSET}$. The resulting output of VGA 902, $V_{ERR}$, is applied to transconductance stage 903.

Figure 10:
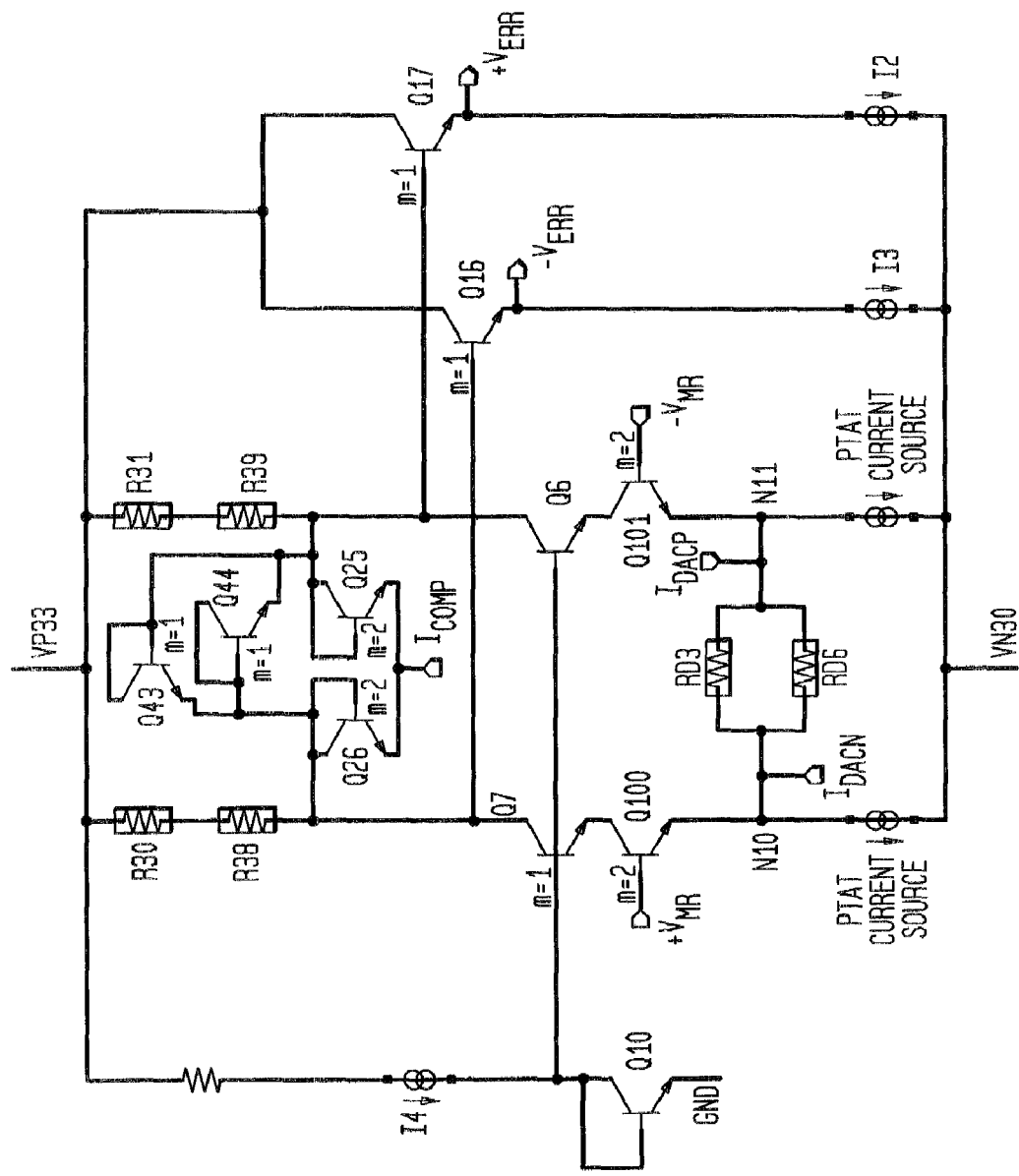
FIG. 10 shows an exemplary circuit schematic for the variable gain amplifier of FIG. 9.

FIG. 10 shows an exemplary circuit schematic for VGA 902 of FIG. 9 that i) compares the sensed voltage Vmr to a programmable offset voltage $V_{OFFSET}$ and ii) amplifies the difference between Vmr and the programmable offset voltage $V_{OFFSET}$ to generate $V_{ERR}$ (across $+V_{ERR}$ and $-V_{ERR}$). The programmable offset voltage $V_{OFFSET}$ is created by applying a pair of programmable currents to inputs IDACP and IDACN across parallel, differential-pair degeneration resistors $R_{D3}$ and $R_{D6}$. Currents IDACP and IDACN are equal in amplitude but of opposite polarity. Thus, currents IDACP and IDACN generate an offset voltage across parallel differential pair degeneration resistors $R_{D3}$ and $R_{D6}$ (between nodes N10 and N11) of FIG. 10. The polarity of the feedback of the MR bias loop is such that the output of VGA 902 is zero volts (differential) when the voltage Vmr across the MR read head is substantially equal to the voltage drop between nodes N10 and N11.

The gain of VGA 902 is controlled by varying the current $I_{COMP}$ (from MR resistance sensor 301) to control the resistance (or conductance) of diode-connected transistors Q25 and Q26. Neglecting emitter resistance of input differential pair transistors Q100 and Q101, the gain $A_{VGA}$ of VGA 902 is $$A_{VGA} = \frac{(2R_L/R_E)}{Gm_A R_L + 1} = \frac{(2R_L/R_E)}{(I_{COMP}/2V_T)R_L + 1}, \tag{15}$$

where $R_E$ is the parallel combination of $R_3$ and $R_6$, $R_L$ is the load resistance created by series resistors R30 and R38 (or R31 and R39, since R30=R31 and R38=R39), and $V_T$ is the thermal voltage for diode-connected transistors Q25 and Q26. $Gm_A$ is the conductance of diode-connected transistors Q25 and Q26, which $Gm_A$ is substantially equivalent to $(I_{COMP}/2 V_T)$.

The unity gain bandwidth UGB of the MR bias loop is maintained by employing output current $I_{COMP}$ from MR resistance sensor 301, which is proportional to the resistance of $R_{MR}$, to control the gain $A_{VGA}$ of the VGA. The MR bias loop UGB is given in equation (16):

$$UGB = A_{VGA} Gm R_0 \frac{R_{MR}}{(R_{MR} + 2R_B)} \frac{1}{2\pi R_0 C_{INT}} = \frac{A_{VGA} Gm R_{MR}}{2\pi R_0 C_{INT}(R_{MR} + 2R_B)} \tag{16}$$

where $R_0$ is the output impedance of transconductance stage 903 (FIG. 9), $C_{INT}$ is the integrator capacitance (FIG. 9), and Gm is the transconductance of transconductance stage 903.

To maintain a constant UGB, the gain of the VGA as a function of $R_{MR}$ is as given in equation (17):

$$A_{VGA} = UGB \frac{2\pi C_{INT}(R_{MR} + 2R_B)}{Gm R_{MR}} \tag{17}$$

where $A_{VGA}$ is then set as given in equation (15).

Figure 11:
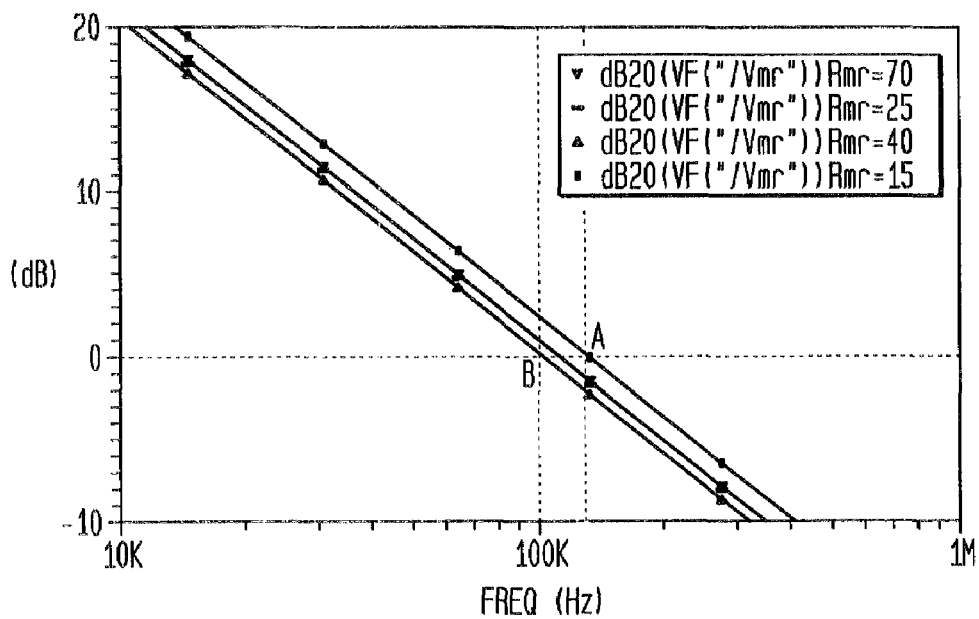
FIG. 11 shows simulation results for unity gain bandwidth versus gain for various values of MR element resistance.
Figure 12:
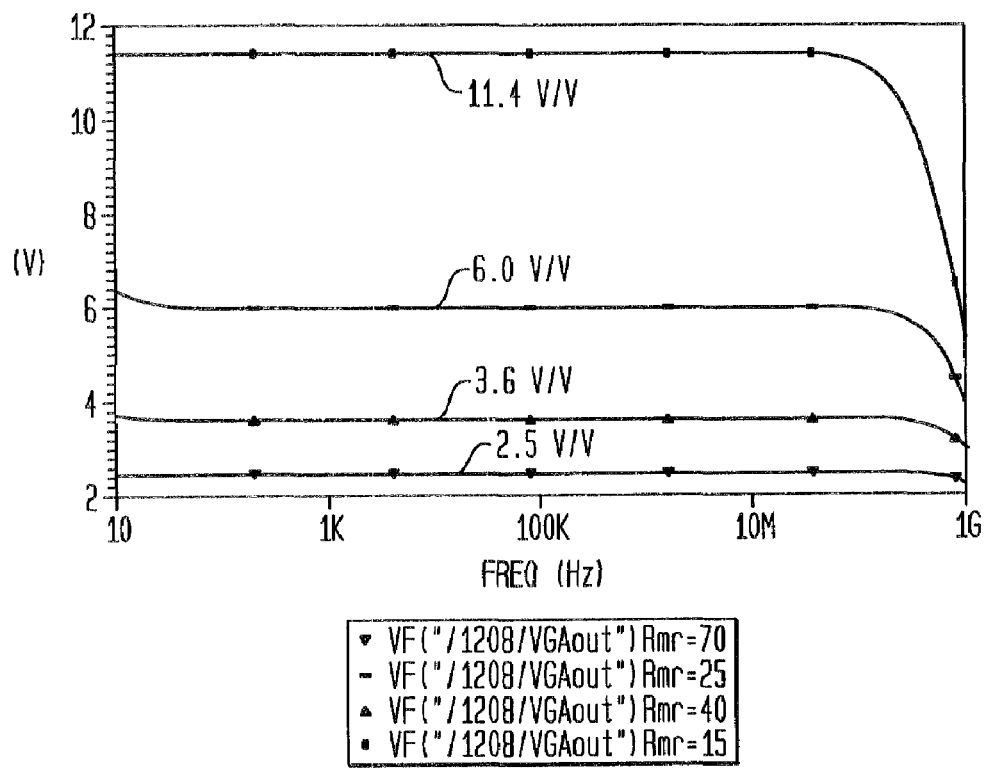
FIG. 12 shows simulation results for variable gain amplifier gain versus frequency for various values of MR element resistance.

An MR bias loop operating in accordance with one or more embodiments of the present invention might be simulated. Simulation results showing the UGB gain of the MR bias loop versus frequency of the VGA for values of $R_{MR}$ equal to 70Ω, 40Ω, 25Ω, and 15Ω are shown in FIG. 11. As can be seen from FIG. 11, the unity gain bandwidth varies by approximately 29% over these values of $R_{MR}$. FIG. 12 shows simulation results for corresponding variable gain amplifier gain (in volts per volt, assuming a 1 volt input signal) versus frequency for values of $R_{MR}$ equal to 70Ω, 40Ω, 25Ω, and 15Ω.

Low corner frequency might be controlled in a manner similar to that described for UGB of the MR bias loop. Returning to FIG. 7, the output of the current generator circuit 700 also includes current $I_{LCF}$. The sourcing current $I_{LCF}$ is derived similarly to that for $I_{COMP}$ (i.e., similarly to generation of $I_{P3}$ in equation (12), except that the value of $Gm_3$ might be scaled to $Gm_{3LCF}$ depending on the implementation and a different-valued current source might be employed). Such scaling might be accomplished by using a different ratio of current mirrors within transconductance stage 705 to generate $I_{P9}$. $I_{P9}$ is combined with sinking current source $I_{P8}$ to generate $I_{LCF}$ as given in equation (18):

$$I_{LCF} = (I_{P9} - I_{P8}) = I_{P9} - Gm_{3LCF} V_T \ln\left[\frac{Gm_1 Vimr}{Gm_2 Vmr}\right] = \tag{18}$$
$$I_{P9} - Gm_{3LCF} V_T \ln\left[\frac{Gm_1}{Gm_2}\left(1 + \frac{R_B}{R_{MR}}\right)\right]$$

To provide control of the low corner frequency $f_{LC}$, $I_{LCF}$ is provided to the MR reader first gain stage. The MR reader first gain stage might be implemented as a cross-coupled current-sense (CCCS) reader operating in a manner similar to that shown and described with respect to the prior art CCCS reader 200 of FIG. 2. The controlling current $I_{LCF}$ is combined with the input differential transistor pair tail current $I_{tail}$ of the MR reader's transconductance stage (with transconductance $Gm_{READER}$). For example, the transconductance stage might be controlled by varying the tail current $I_{tail}$ of the transconductance stage's differential transistor pair to adjust emitter resistance as a function of the resistance value of $R_{MR}$. For this example, the low corner frequency $f_{LC}$ is as given in equation (19):

$$f_{LC} = \frac{AGm_{READER}}{C_{CC}} \approx \frac{2R_L Gm_{READER}}{R_{MR}C_{CC}} = \frac{2R_L k(I_{tail} + I_{FLC})}{R_{MR}C_{CC}V_T}, \quad (19)$$

where k is the output current mirror ratio of the CCCS reader transconductance stage, $C_{CC}$ is the coupling capacitance used to AC-couple the transconductance stage to the MR head differential amplifier used to generate $V_{OUT}$ from Vmr, and $R_L$ is the load resistance of the MR head differential amplifier. To maintain a constant $f_{LC}$, the output of MR resistance sensor 301 is as given in equation (20):

$$I_{LCF} = \frac{f_{LC}V_T C_{CC} R_{MR}}{2kR_L} - I_{tail} \quad (20)$$

Figure 13:
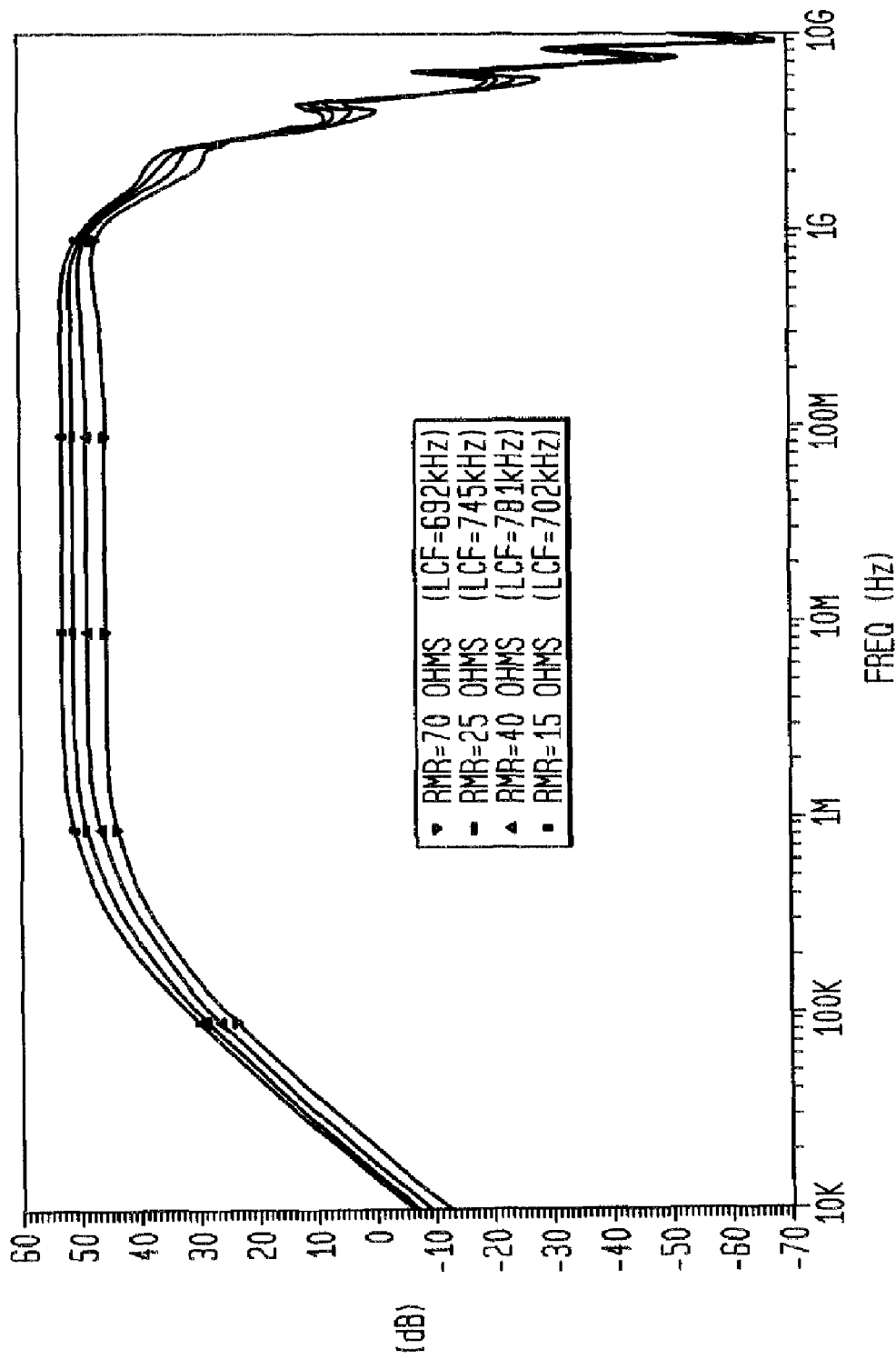
FIG. 13 shows simulation results for an exemplary MR reader's gain as a function of low corner frequency for various values of MR element resistance.

FIG. 13 shows simulation results for an exemplary MR reader's gain as a function of low corner frequency for values of $R_{MR}$ equal to 70Ω, 40Ω, 25Ω, and 15Ω. As shown in FIG. 13, the low corner frequency varies by approximately 11% for these values of $R_{MR}$.

Returning to FIG. 9, the output of MR resistance sensor 301 also includes current $I_{SLEW}$. To provide control of the MR reader voltage slew rate, $I_{SLEW}$ is provided to transconductance stage 903 of MR bias circuit 302. The slew rate may be adjusted by controlling the maximum current $I_{GmAMX}$ provided from transconductance stage 903. The sourcing current $I_{SLEW}$ is derived similarly to that for $I_{COMP}$ (via generation of $I_{P3}$ in equation (12)), except that the value of $Gm_3$ might be scaled to $Gm_{3SLEW}$ depending on the implementation. Such scaling might be accomplished by using a different ratio of current mirrors within transconductance stage 705 of FIG. 7 to generate $I_{P5}$. $I_{P5}$ is combined with sinking current source $I_{P6}$ to generate $I_{SLEW}$ as given in equation (21):

$$I_{SLEW} = -(I_{P6} - I_{P5}) = -\left(I_{P6} - Gm_{3SLEW}V_T \ln \frac{Gm_1 Vimr}{Gm_2 Vmr}\right) = \quad (21)$$
$$-\left(I_{P6} - Gm_{3SLEW}V_T \ln\left[\frac{Gm_1}{Gm_2}\left(1 + \frac{R_B}{R_{MR}}\right)\right]\right).$$

As indicated in equation (21), the negative sign indicates that the current returns to transconductance stage 705, which might occur if the combination of $I_{P5}$ and $I_{P6}$ is applied to a PMOS mirror so that the output current is sourcing instead of sinking.

Figure 14:
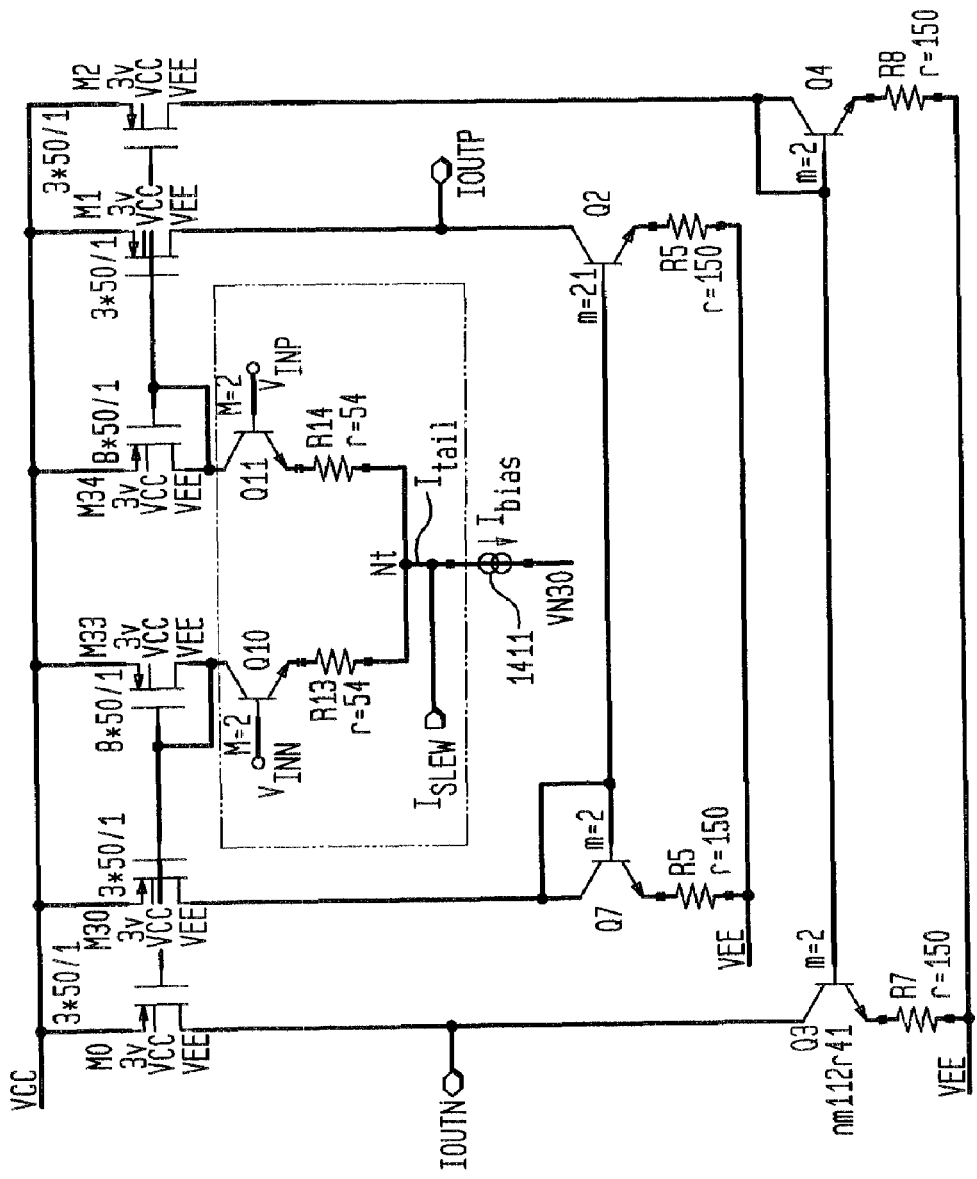
FIG. 14 shows a simplified circuit schematic of the transconductance stage of FIG. 9 providing control of MR read head voltage slew rate.

As described above, the slew rate may be adjusted by controlling the maximum current $I_{GmMAX}$ provided from transconductance stage 903. Current $I_{SLEW}$ might be used to vary the tail current $I_{tail}$ of the input differential pair of transconductance 903 and, thus, to vary the maximum output current. FIG. 14 shows a simplified circuit schematic of transconductance stage 903 providing control of MR reader voltage slew rate with input current $I_{SLEW}$. Transconductance stage 903 receives differential voltage $V_{ERR}$ from VGA 902 (FIG. 9) across nodes VINN and VINP. Transconductance stage 903, based on the voltage $V_{ERR}$ across nodes VINN and VINP, generates differential output current at nodes IOUTN and IOUTP. The configuration of transistors Q10 and Q11 and resistors R13 and R14 form input differential pair 1410 of transconductance 903. Input differential pair 1410 is employed to drive MOS transistors (MOSs) M33 and M34. MOSs M33 and M34 are each coupled to the output differential amplifiers employed to generate currents at corresponding nodes IOUTN and IOUTP. Input differential pair 1410 is biased via tail current $I_{tail}$ at node Nt, and $I_{tail}$ is formed from a combination of $I_{SLEW}$ with current $I_{bias}$ from current source 1411.

If MR element resistance varies from 50Ω to 70Ω without controlling the slew rate, the slew rate ratio (Ratio($S_{HEAD}$)) indicating slew rate increase is given in equation (22):

$$\text{Ratio}(S_{HEAD}) = \frac{R_{MR2}(R_{MR1} + 2R_B)}{R_{MR1}(R_{MR2} + 2R_B)} = \frac{70 \times (50 + 2 \times 300)}{50 \times (70 + 2 \times 300)} = 1.36 \quad (22)$$

Figure 15:
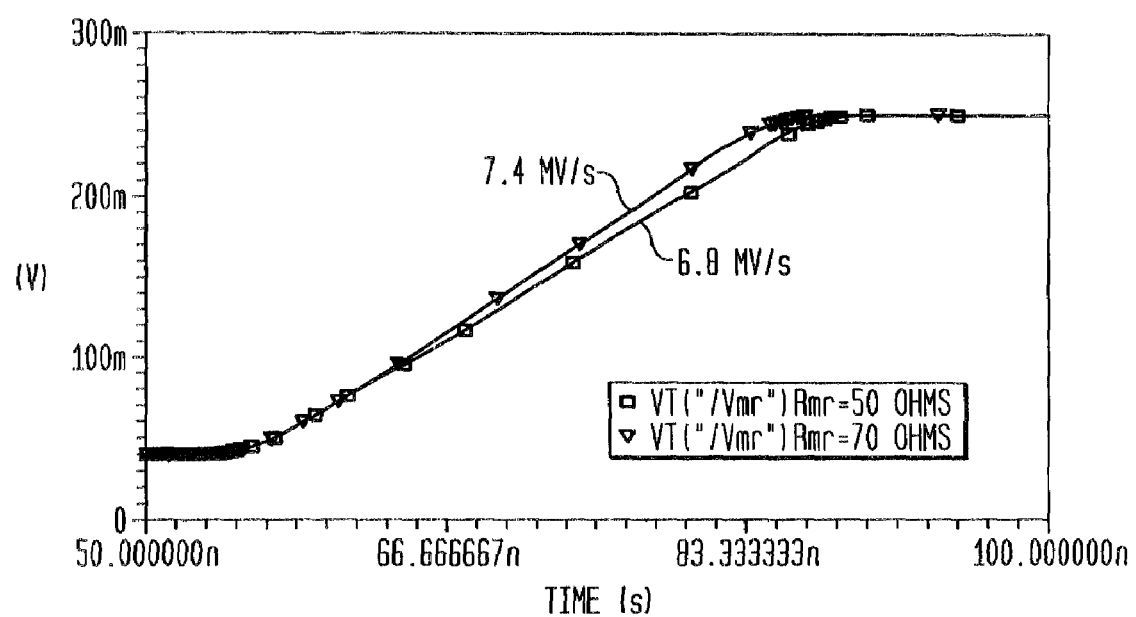
FIG. 15 shows simulation results for slew rate for various values of MR resistance when slew rate control is employed in accordance with exemplary embodiments of the present invention.

FIG. 15 shows simulation results for low corner frequency if MR element resistance varies from 50Ω to 70Ω with slew rate control in accordance with exemplary embodiments of the present invention. As shown in FIG. 15, the change in slew rate seen at the head is reduced from that given in equation (15). The ratio (Ratio($S_{HEAD}$)) of the two slew rates in the simulation of FIG. 15 is given in equation (23):

$$\text{Ratio}(S_{HEAD}) = \frac{7.4 \text{mV/sec}}{6.8 \text{mV/sec}} = 1.09. \quad (23)$$

An MR read head employing a circuit for reading MR resistance variations in accordance with an exemplary embodiment of the present invention allows for the following advantages. Unity gain bandwidth of the MR bias loop and the low corner frequency of the MR reader are controlled as a function of the MR element resistance. By reducing variations in these frequencies, higher MR loop gains might be achieved, thereby increasing the performance (e.g., accuracy) of the MR bias loop. Further, reducing interaction between the MR bias loop and the MR reader low corner frequency loop tends to prevent peaking in the AC response of the MR reader, loop instability, and corruption of read data. Finally, by controlling the slew rate seen at the read head, write-to-read recovery times are reduced. Thus, overall system performance is improved over prior art systems.

While the present invention has been described with respect to exemplary embodiments of a magnetic recording system, the present invention is not so limited. One skilled in the art might extend the teachings herein to other types of recording systems, such optical recording systems. In addition, while the present invention has been described with respect to various equations, one skilled in the art might extend the form of the various equations by way of constants and linear functions, or through approximations. Consequently, the equations described herein are an aid to understanding the present invention.

While the exemplary embodiments of the present invention have been described with respect to a circuit and/or a system with block diagrams, the various functional elements of the present invention may be implemented in the digital domain as processing steps in a software program. Such software may be employed in, for example, a digital signal processor, dedicated logic circuit, micro-controller, or general-purpose computer.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An apparatus for generating at least one signal related to an impedance of a read element in a read channel of a read head, the apparatus comprising:
a first circuit, coupled across the read element, configured to provide a first signal from the read element;
a second circuit, coupled across a read head circuit portion including the read element and at least one other circuit element connected to the read element, configured to provide a second signal from the read head circuit portion, wherein the at least one other circuit element comprises first and second resistors connected on either side of the read element;
a third circuit, coupled to the first and second circuits, configured to generate a combination of the first and second signals as the at least one signal related to the impedance of the read element; and
a bias circuit coupled to the read element, the bias circuit configured to apply a biasing signal to the read element, wherein the bias circuit comprises:
an amplifier adapted to adjust a gain of the first signal of the read element;
a transconductance stage, coupled to the amplifier, adapted to apply a transconductance to the gain adjusted first signal to generate an output bias current; and
an integrator adapted to integrate the output bias current of the transconductance stage to provide the biasing signal to the read element.

2. The invention as recited in claim 1, wherein the at least one signal is employed to control at least one of i) a read element bias and ii) a gain of the first signal.

3. The invention as recited in claim 1, wherein the read element is a magneto-resistive (MR) element, and wherein:
the first and second circuits are first and second transconductance stages, respectively;
the first signal is representative of a first voltage across the MR element and the second signal is representative of a second voltage across the read head circuit portion; and
the third circuit comprises:
1) circuitry coupled to the first and second signals and configured to generate a voltage difference based on the first and second signals, and
2) a third transconductance stage coupled to the circuitry, configured to generate, based on the voltage difference, the at least one signal related to the impedance of the MR element.

4. The invention as recited in claim 3, further comprising an amplifier coupled to the MR element and configured to apply gain to the MR element, wherein:
the at least one signal related to the impedance of the MR element includes a low corner frequency (LCF) control signal, wherein the LCF control signal is applied to the amplifier so as to set an LCF of the read head.

5. The invention as recited in claim 3, wherein the circuitry comprises a diode pair coupled and connected to generate the voltage difference.

6. The invention as recited in claim 1, wherein the at least one signal related to the impedance of the read element includes a bias control signal, and wherein:
the bias control signal varies a gain of the amplifier so as to maintain a predetermined level of unity gain bandwidth of the read head.

7. The invention as recited in claim 1, wherein the at least one signal related to the impedance of the read element includes a slew rate control signal, and wherein:
the slew rate control signal is applied to the transconductance stage to adjust the maximum value of the output bias current provided from the transconductance stage.

8. The invention as recited in claim 1, further comprising a preamplifier, coupled to the read element, adapted to apply a gain to the first signal of the read element.

9. The invention as recited in claim 8, wherein the preamplifier includes a transconductance stage coupled to the read element, wherein the at least one signal related to the impedance of the read element includes a low corner frequency (LCF) control signal, and wherein:
the LCF control signal is applied to the transconductance stage of the preamplifier so as to vary a tail current of the transconductance stage to maintain a predefined LCF.

10. The invention as recited in claim 9, wherein the transconductance stage includes a differential transistor pair, and the LCF control signal varies the tail current of the differential transistor pair so as to adjust a resistance of the differential transistor pair as a function of resistance of the read element.

11. The invention as recited in claim 9, wherein the preamplifier is a cross-coupled current sense reader preamplifier.

12. The invention as recited in claim 1, wherein the apparatus is implemented in an integrated circuit (IC).

13. The invention as recited in claim 12, wherein the IC is included in a read channel component of a recording system.

14. The invention as recited in claim 1, wherein the first signal is distinct from the second signal.

15. A read head for a read channel component of a recording system, the read head comprising:
a read element;
an amplifier coupled to the read element and adapted to amplify a voltage signal across the read element;
a bias circuit coupled to the read element and adapted to apply a biasing signal to the read element; and
an impedance sensor coupled to the read element and adapted to sense the impedance of the read element and generate one or more control signals for controlling operations of at least one of the preamplifier and the bias circuit, wherein the one or more control signals comprise both of:
a slew rate control signal adapted to be applied to the bias circuit so as to set a slew rate of the read head; and
a low corner frequency (LCF) control signal adapted to be applied to the amplifier so as to set an LCF of the read head, wherein the impedance sensor comprises:
a first transconductance stage coupled across the read element and adapted to generate a first current signal representative of the impedance of the read element;
a second transconductance stage coupled across a resistor divider chain that includes the read element and adapted to generate a second current signal representative of the impedance of the resistor divider chain;
circuitry coupled to receive the first and second current signals and adapted to generate a difference voltage signal representative of a difference between the first and second current signals; and
a third transconductance stage coupled to receive the difference voltage signal and adapted to generate one or more control current signals from which the one or more control signals are generated.

16. The invention as recited in claim 15, wherein the one or more control signals further comprise a bias control signal adapted to be applied to the bias circuit so as to set a unity gain bandwidth of the read head.

17. A read head for a read channel component of a recording system, the read head comprising:
- a read element;
- an amplifier coupled to the read element and adapted to amplify a voltage signal across the read element;
- a bias circuit coupled to the read element and adapted to apply a biasing signal to the read element; and
- an impedance sensor coupled to the read element and adapted to sense the impedance of the read element and generate one or more control signals for controlling operations of at least one of the preamplifier and the bias circuit, wherein the impedance sensor comprises:
  - a first transconductance stage coupled across the read element and adapted to generate a first current signal representative of the impedance of the read element;
  - a second transconductance stage coupled across a resistor divider chain that includes the read element and adapted to generate a second current signal representative of the impedance of the resistor divider chain;
  - circuitry coupled to receive the first and second current signals and adapted to generate a difference voltage signal representative of a difference between the first and second current signals; and
  - a third transconductance stage coupled to receive the difference voltage signal and adapted to generate one or more control current signals from which the one or more control signals are generated.

18. An apparatus for generating at least one signal related to an impedance of a read element in a read channel of a read head, the apparatus comprising:
- a first circuit, coupled across the read element, configured to provide a first signal of the read element;
- a second circuit, coupled across a read head circuit portion including the read element, configured to provide a second signal of the read head circuit portion; and
- a third circuit, coupled to the first and second circuits, configured to generate a combination of the first and second signals as the at least one signal related to the impedance of the read element, wherein:
  - the read element is a magneto-resistive (MR) element;
  - the first and second circuits are first and second transconductance stages, respectively;
  - the first signal is representative of a first voltage across the MR element and the second signal is representative of a second voltage across the read head circuit portion; and
  - the third circuit comprises:
    1) circuitry coupled to the first and second signals and configured to generate a voltage difference based on the first and second signals, and
    2) a third transconductance stage coupled to the circuitry, configured to generate, based on the voltage difference, the at least one signal related to the impedance of the MR element.

19. The invention as recited in claim 18, further comprising a bias circuit coupled to the MR element and configured to set a bias of the MR element, wherein:
- the at least one signal related to the impedance of the MR element includes a bias control signal; and
- the bias control signal is applied to the bias circuit so as to set a unity gain bandwidth of the read head.

20. The invention as recited in claim 18, further comprising a bias circuit coupled to the MR element and configured to set a bias of the MR element, wherein:
- the at least one signal related to the impedance of the MR element includes a slew rate control signal; and
- the slew rate control signal is applied to the bias circuit so as to set a slew rate of the read head.

21. The invention as recited in claim 18, further comprising an amplifier coupled to the MR element and configured to apply gain to the MR element, wherein:
- the at least one signal related to the impedance of the MR element includes a low corner frequency (LCF) control signal; and
- the LCF control signal is applied to the amplifier so as to set an LCF of the read head.

22. The invention as recited in claim 18, wherein the circuitry comprises a diode pair coupled and connected to generate the voltage difference.

23. An apparatus for generating at least one signal related to an impedance of a read element in a read channel of a read head, the apparatus comprising:
- a first circuit, coupled across the read element, configured to provide a first signal of the read element;
- a second circuit, coupled across a read head circuit portion including the read element, configured to provide a second signal of the read head circuit portion;
- a third circuit, coupled to the first and second circuits, configured to generate a combination of the first and second signals as the at least one signal related to the impedance of the read element; and
- a bias circuit coupled to the read element, the bias circuit configured to apply a biasing signal to the read element, wherein the bias circuit comprises:
  - an amplifier adapted to adjust a gain of the first signal of the read element;
  - a transconductance stage, coupled to the amplifier, adapted to apply a transconductance to the gain adjusted first signal to generate an output bias current; and
  - an integrator adapted to integrate the output bias current of the transconductance stage to provide the biasing signal to the read element, wherein:
    - the at least one signal related to the impedance of the read element includes a slew rate control signal; and
    - the slew rate control signal is applied to the transconductance stage to adjust the maximum value of the output bias current provided from the transconductance stage.

24. The invention as recited in claim 23, wherein the at least one signal related to the impedance of the read element includes a bias control signal, and wherein:
- the bias control signal varies a gain of the amplifier so as to maintain a predetermined level of unity gain bandwidth of the read head.

25. An apparatus for generating at least one signal related to an impedance of a read element in a read channel of a read head, the apparatus comprising:
- a first circuit, coupled across the read element, configured to provide a first signal from the read element;
- a second circuit, coupled across a read head circuit portion including the read element, configured to provide a second signal from the read head circuit portion;
- a third circuit, coupled to the first and second circuits, configured to generate a combination of the first and second signals as the at least one signal related to the impedance of the read element; and
- a preamplifier, coupled to the read element, adapted to apply a gain to the first signal of the read element, wherein the preamplifier includes a transconductance stage coupled to the read element, wherein the at least one signal related to the impedance of the read element includes a low corner frequency (LCF) control signal, and wherein the LCF control signal is applied to the transconductance stage of the preamplifier so as to vary a tail current of the transconductance stage to maintain a predefined LCF.

26. The invention as recited in claim 25, wherein the transconductance stage includes a differential transistor pair, and the LCF control signal varies the tail current of the differential transistor pair so as to adjust a resistance of the differential transistor pair as a function of resistance of the read element.

27. The invention as recited in claim 25, wherein the preamplifier is a cross-coupled current sense reader preamplifier.

* * * * *